H. L. EMERY.
Harvester.
No. 25,888.
Patented Oct. 25, 1859.
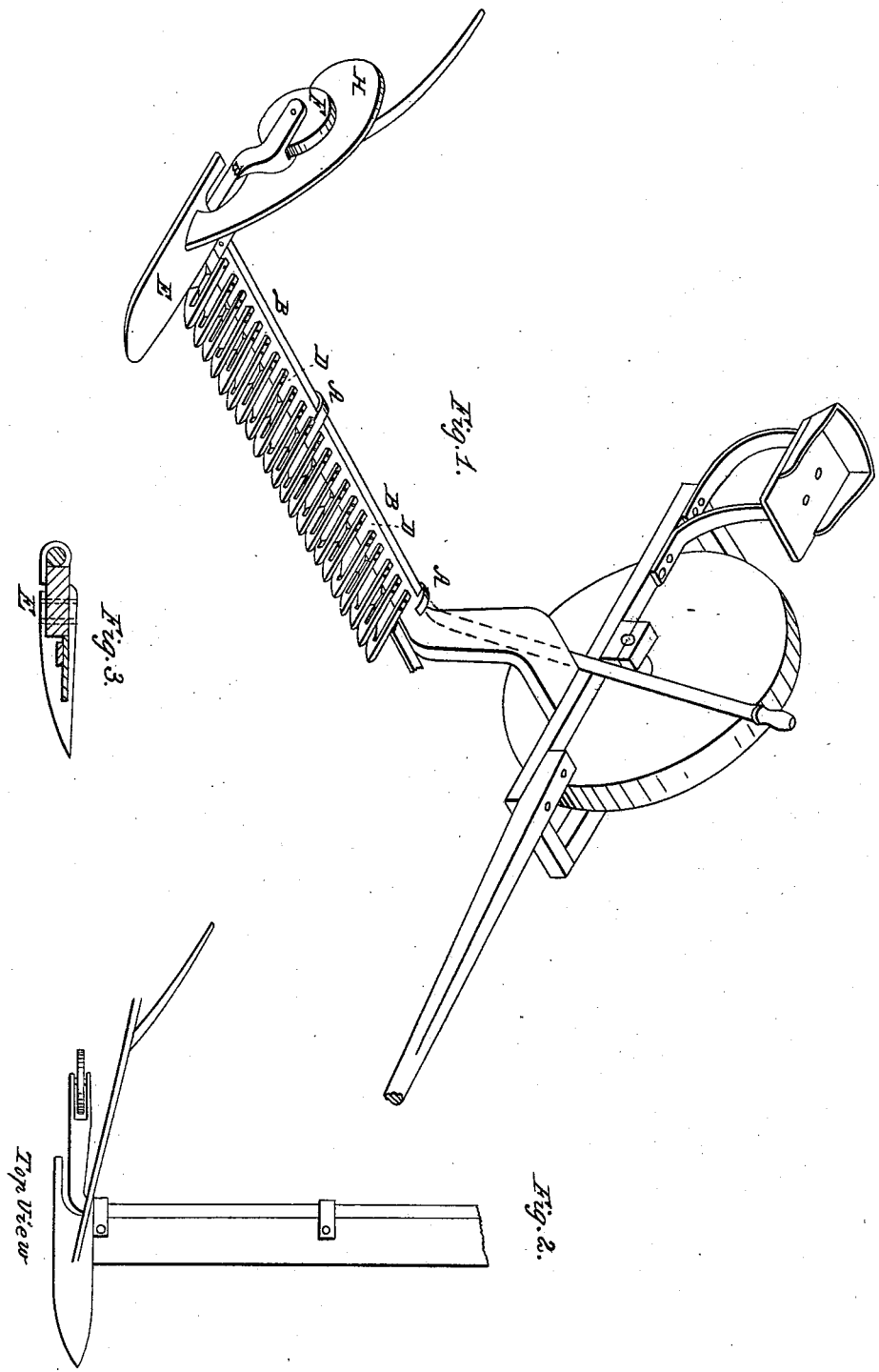
Witnesses:
E. M. Parker
B. S. Powers

UNITED STATES PATENT OFFICE.

HORACE L. EMERY, OF ALBANY, NEW YORK.

IMPROVEMENT IN HARVESTERS.

Specification forming part of Letters Patent No. 25,888, dated October 25, 1859.

*To all whom it may concern:*

Be it known that I, HORACE L. EMERY, of the city of Albany, in the State of New York, have invented an Improvement in Grass-Harvesters; and I do hereby declare that the following is a full and exact description thereof, reference being had to the accompanying drawing, and to the letters of reference marked thereon.

The nature of my invention consists in attaching a small adjustable wheel to the outer end of the cutter-bar of mowing-machines.

To enable others skilled in the art to make and use my invention, I will proceed to describe its operation and construction.

I make the cutter-bar of a mowing-machine, to which the finger-guards are attached, of wood, or iron or any other metallic substance, and on the back part of it attach two or more loops for a rod to pass through, resting in the loops and against the back part of the cutter-bar; or the cutter-bar may be made of two pieces of boiler-plate, or of cast-iron, and made hollow for the same rod to pass through and to give it strength. These loops are marked A, the rod marked B, and the cutter-bar marked D in the drawing. This rod is flat, about two inches wide and one-half inch thick, or round, and is bent up, so that it will form a lever and be convenient to the driver on the driver's seat, and at the other end it is bent nearly at right angles backward, and a small wheel is attached to it in the rear of the shoe on the outer end of the cutter-bar, where it is protected from the cut grass by the shoe and the track-clearer. The rod or lever is bent up where the wheel is attached to it, and by operating the lever at the other end the wheel may be depressed, which will raise the cutter-bar, and by confining the handle of the lever by means of a pin on the side piece of the frame, or any other similar manner, the cutter-bar may be held at any desired height, so that the machine may be drawn from place to place.

The shoe on the outer end of the cutter is represented by the letter E, the small wheel by the letter F, and the track-clearer by the letter H in the drawing hereto annexed.

In cutting grass it is necessary that the cutters should be near to the surface of the ground, and when the machine is not in operation, and it is desirable to move the same, the cutter-bar should be raised from the ground to clear obstructions, and even when it is in operation it is frequently desirable to raise the cutter-bar to pass over the cut grass and other obstructions. I place this wheel at the outer end to avoid the difficulty of having the cut grass lodged upon it, which it would do if placed at any other point except near the heel of the cutters, and if placed there so much weight is thrown upon a wheel, which must necessarily be small, that it would often sink into the ground and prevent its operation.

Having fully described the nature of my invention and shown the manner in which the same may be made available, what I claim as my invention, and desire to secure by Letters Patent, is—

1. Combining with the cutter-bar an adjustable arm or lever provided with a roller or other means of sliding easily upon the ground for the purpose of sustaining the cutter-bar at any required distance from the ground, or allowing it to rest upon the ground at pleasure, for purposes herein set forth.

2. Placing said arm directly in rear of the shoe, in order that it may be prevented by said shoe from clogging, as described.

3. Connecting said arm by a rod along the back of the cutter-bar with a lever near the frame of the machine, so that the attendant may elevate and depress the cutter-bar at pleasure.

HORACE L. EMERY.

Witnesses:
E. M. PARKER,
B. S. POWERS.